United States Patent
Caretti et al.

(10) Patent No.: US 10,085,277 B2
(45) Date of Patent: Sep. 25, 2018

(54) SCHEDULING METHOD AND SYSTEM FOR FOURTH GENERATION RADIO MOBILE NETWORKS

(71) Applicants: Telecom Italia S.p.A., Milan (IT); Politecnico di Torino, Turin (IT)

(72) Inventors: Marco Caretti, Turin (IT); Carla Fabiana Chiasserini, Turin (IT); Gian Michele Dell'aera, Turin (IT); Zana Limani, Turin (IT); Bruno Melis, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 15/511,752

(22) PCT Filed: Sep. 19, 2014

(86) PCT No.: PCT/EP2014/069982
§ 371 (c)(1),
(2) Date: Mar. 16, 2017

(87) PCT Pub. No.: WO2016/041604
PCT Pub. Date: Mar. 24, 2016

(65) Prior Publication Data
US 2017/0251489 A1   Aug. 31, 2017

(51) Int. Cl.
*H04W 72/12* (2009.01)
*H04W 72/08* (2009.01)
(Continued)

(52) U.S. Cl.
CPC ..... *H04W 72/1263* (2013.01); *H04W 72/082* (2013.01); *H04W 72/1231* (2013.01);
(Continued)

(58) Field of Classification Search
CPC ......... H04L 29/06523; H04L 29/08954; H04L 67/322; H04L 12/1811; H04L 47/41;
(Continued)

(56) References Cited

U.S. PATENT DOCUMENTS

2010/0135236 A1* 6/2010 Wang ................ H04W 72/1257
370/329
2011/0243085 A1* 10/2011 Seo ........................ H04B 7/024
370/329
(Continued)

FOREIGN PATENT DOCUMENTS

EP           2632075 A1    8/2013

OTHER PUBLICATIONS

K. Sundaresan and S. Rangarajan, "Energy Efficient Carrier Aggregation Algorithms for Next Generation Cellular Networks", 2013 21st IEEE International Conference on Network Protocols (IEEE ICNP 2013), Oct. 7-10, 2013.
(Continued)

*Primary Examiner* — Warner Wong
(74) *Attorney, Agent, or Firm* — Banner & Witcoff, Ltd.

(57) ABSTRACT

A method is proposed for scheduling, in a radio mobile network, serving cell/radio resource allocation pairs for transmission of data flows using Carrier Aggregation. Each serving cell/radio resource allocation pair includes a serving cell and a radio resource thereof allocated for transmission of data flows using Carrier Aggregation. At each scheduling period the method determines active data flows whose transmission is not yet completed at the current scheduling period, and performs a series of steps for each active data flow.

15 Claims, 3 Drawing Sheets

Figure 1:
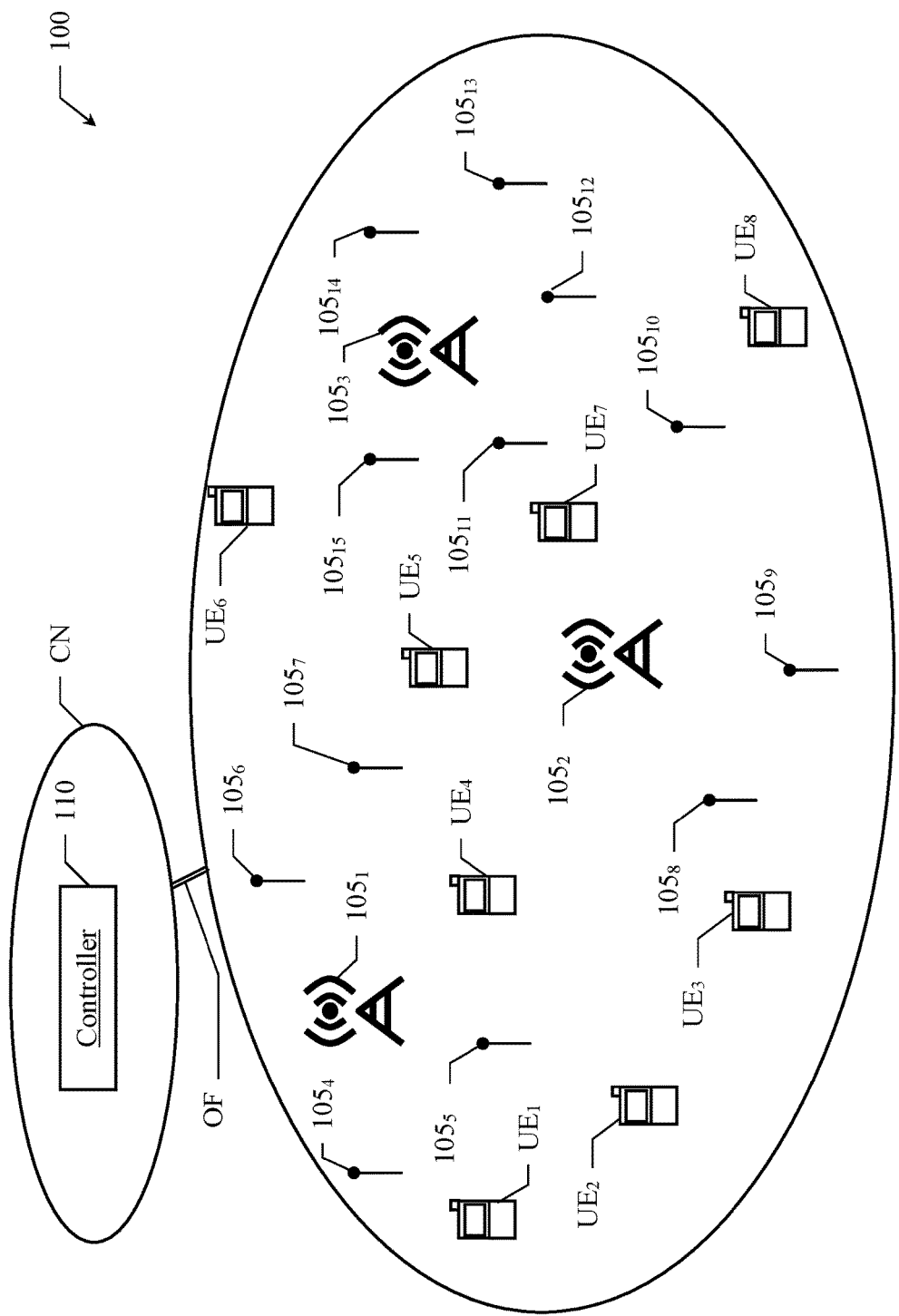

(51) Int. Cl.
  *H04L 29/08* (2006.01)
  *H04L 12/927* (2013.01)
(52) U.S. Cl.
  CPC ...... *H04L 29/08954* (2013.01); *H04L 47/805* (2013.01); *H04W 72/1242* (2013.01)
(58) Field of Classification Search
  CPC .. H04L 47/827; H04L 47/805; H04W 52/281; H04W 72/00; H04W 72/1263; H04W 72/1231; H04W 72/082; H04W 72/1242; H04W 72/12
  See application file for complete search history.

(56) References Cited

U.S. PATENT DOCUMENTS

| | | | |
|---|---|---|---|
| 2014/0161058 A1 | 6/2014 | Sundaresan et al. | |
| 2015/0029943 A1* | 1/2015 | Ratasuk | H04W 74/04 370/329 |
| 2016/0227385 A1* | 8/2016 | Ahmad | H04L 65/4061 |
| 2016/0309492 A1* | 10/2016 | Ma | H04W 72/0446 |

OTHER PUBLICATIONS

H. Wang, C. Rosa, and K. Pedersen, "Analysis of Optimal Carrier Usage for LTE-A Heterogeneous Networks with Multicell Cooperation", IEEE Globecom, 2013.

Jun. 2, 2015—(WO) International Search Report and Written Opinion of the ISA—App PCT/EP2014/069982.

Yuanye Wang et al: "Utility Maximization in LTE-Advanced Systems with Carrier Aggregation", Vehicular Technology Conference (VTC Spring), 2011 IEEE 73rd, IEEE, May 15, 2011 (May 15, 2011), pp. 1-5, XP031896894, ISBN: 978-1-4244-8332-7, DOI: 10.1109/VETECS.2011.5956494.

Pedersen, K. I., Frederiksen, F., Rosa, C., Nguyen, H. T., Garcia, L. G. U., & Wang, Y. (2011). Carrier; Aggregation for LTE-Advanced: Functionality and Performance Aspects. IEEE Communications Magazine,; 49(6), Jun. 2011, pp. 89-95.

Garcia, L. G. U., Pedersen, K., & Mogensen, P. (2009). Autonomous component carrier selection: interference; management in local area environments for LTE-advanced. IEEE Communications Magazine, 47(9), pp. 110-116.

X. Lin, J. G. Andrews and A. Ghosh, "Modelling, Analysis and Design for Carrier Aggregation in Heterogeneous Cellular Networks", IEEE Transactions on Communications 61(9) Sep. 2013, pp. 4002-4015.

H. Wang, C. Rosa, and K. Pedersen, "Analysis of Optimal Carrier Usage for LTE-A Heterogeneous Networks with Multicell Cooperation", IEEE Globecom, 2013 [Abstract Only].

Wang, Y., Pedersen, K., Sorensen, T. B., & Mogensen, P. (2010). Carrier Load Balancing and Packet Scheduling for Multi-Carrier Systems. IEEE Wireless Communications, 9(5), pp. 1780-1789.

K. Sundaresan and S. Rangarajan, "Energy Efficient Carrier Aggregation Algorithms for Next Generation Cellular Networks", 2013 21st IEEE International Conference on Network Protocols (IEEE ICNP 2013), Oct. 7-10, 2013 [Abstract Only].

* cited by examiner

SCHEDULING METHOD AND SYSTEM FOR FOURTH GENERATION RADIO MOBILE NETWORKS

BACKGROUND OF THE INVENTION

Field of the Invention

The present invention generally relates to wireless communication networks, such as radiomobile or cellular networks—e.g., 2G, 3G, 4G or LTE/LTE-Advanced, and, in view of new forthcoming technologies, 5G (and beyond) cellular networks. More particularly, the present invention relates to heterogeneous cellular networks, and to a method for efficiently managing allocation of radio resources blocks in such cellular networks.

Overview of the Related Art

Cellular networks (e.g., 2G, 3G, LTE/LTE-Advanced and the forthcoming 5G cellular networks) allow data traffic (also referred to as traffic load) to be high-speed conveyed between a fixed-location transceiver base station (or node) radiating radio waves over a respective land area (cell) and user equipments (e.g., user terminals, such as cellular phones) within the cell.

Cellular networks have experimented a significant growth in terms of spread and performance, and, in order to face the exponential increase in data traffic demand, have recently evolved into heterogeneous cellular networks (HetNets). Broadly speaking, each heterogeneous cellular network comprises both relatively high-power and wide-coverage nodes (hereinafter, primary or macro nodes), identifying so-called macro cells, and a number of lower-power, smaller-coverage nodes (hereinafter, secondary or small nodes, e.g. micro, pico, femto nodes) identifying small cells within the macro cells for enhancing overall coverage and capacity.

However, heterogeneous cellular networks also introduce technical issues, the most prominent being the interference arising between different cellular layers sharing same spectrum radio resources. In order to mitigate these issues, techniques such as "Inter Cell Interference Coordination" (ICIC) have been proposed, comprising "Cell Range Expansion" and applying "Almost Blank Sub-frames" (ABS) for user equipment at cell edges, and Carrier Aggregation.

Carrier Aggregation allows concurrent use of several component carriers to provide an aggregated bandwidth (e.g., up to 100 MHz) in order to meet "International Mobile Telecommunications-Advanced" (IMT-Advanced) requirements for high peak data rates. The individual component carriers may be of different bandwidths supported by LTE (e.g., ranging from 1.4 MHz to 20 MHz) and in general may belong to different frequency bands. This implies that different component carriers may also have very different coverage areas, as propagation conditions may vary greatly from one component carrier to another one. From this perspective, Carrier Aggregation used in combination with heterogeneous cellular network may be an effective interference mitigation technique.

Heterogeneous cellular network with Carrier Aggregation capabilities have been investigated in some prior art works.

In K. I. Pedersen, F. Frederiksen, C. Rosa, H. Nguyen, L. G. U. Garcia, and Y. Wang, "*Carrier Aggregation for LTE-Advanced: Functionality and Performance Aspects*", IEEE Communications Magazine, June 2011, and in L. G. U. Garcia, K. I. Pedersen and P. E. Mogensen, "*Autonomous Component Carrier Selection: Interference Management in Local Area Environments for LTE-Advanced*", IEEE Communications Magazine, September 2009, the authors propose an autonomous carrier selection algorithm which ultimately serves as an interference coordination technique between low-power cells.

In X. Lin, J. G. Andrews and A. Ghosh, "*Modelling, Analysis and Design for Carrier Aggregation in Heterogeneous Cellular Networks*", IEEE Transactions on Communications, the authors propose a load-aware model for LTE HetNets with Carrier Aggregation using the proportional fair scheduling algorithm. Using the model, the authors analyze the impact of biasing in combination with Carrier Aggregation and different band deployment configurations.

In H. Wang, C. Rosa, and K. Pedersen, "*Analysis of Optimal Carrier Usage for LTE-A Heterogeneous Networks with Multicell Cooperation*", IEEE GLOBECOM, 2013, the authors present a comparison between several carrier deployment configurations for macrocells and microcells, and then analyze the benefits of applying cooperation techniques between cells for each configuration. The authors address the extreme configuration cases where dedicated carriers are assigned to macrocells and microcells, and where all carriers are available at all cells (the co-channel configuration), and two other hybrid configurations. They also consider two cell cooperation techniques, the eICIC and the "inter/intra site CA" which allows users to connect to two different base stations on different carriers (multi-flow CA).

In Y. Wang, K. I. Pedersen, T. B. Sorensen and P. E. Mogensen, "*Carrier Load Balancing and Packet Scheduling for Multi-Carrier Systems*", IEEE Transactions on Wireless Communications, May 2010, the authors propose a two-step procedure where load balancing among the different carriers is performed before the resources are allocated according to proportional-fair based scheduler. Two approaches are proposed for load balancing among legacy users, a round-robin scheme which allocates new users to the carrier with the lowest load, and a mobile hashing scheme, which assigns new users randomly over the carriers, which aims at ensuring balanced load across the carriers in the long term. The CA-enabled users are automatically assigned on all available CCs. Two versions of the proportional fair scheduling algorithm are proposed: the independent scheduling scheme, where users on each CC are scheduled independently from other CCs, and the cross-CC scheduling, where scheduling is performed taking into consideration scheduling in other CCs. The latter version aims at enhancing fairness for users that do not support Carrier Aggregation.

In K. Sundaresan and S. Rangarajan, "*Energy Efficient Carrier Aggregation Algorithms for Next Generation Cellular Networks*", IEEE ICNP 2013, the authors address the resource allocation problem in a scenario where users are assigned only a subset of the available carriers for energy saving purposes.

SUMMARY OF INVENTION

The Applicant has recognized that none of the cited prior arts solutions is completely satisfactory. Indeed, in Pedersen and Garcia works no issues are addressed about resource allocation once carrier selection is performed, in Lin and H. Wang works no addressing to resource allocation issue (while instead using a proportional-fair scheduler to schedule the resources available at each carrier), and in Sundaresan work interference aspects are not tackled as the authors consider only a single-cell LTE network.

In view of the above, the Applicant has tackled the problem of devising a simple and effective solution aimed at radio resources allocation in LTE networks that combines heterogeneous two-layer network and Carrier Aggregation. More particularly, unlike the above mentioned works, the proposed solution is addressed at the resource allocation problem by tackling both the problems transpiring due to the heterogeneity of the network, i.e., the inter-cell interference, and the complexity imposed by the availability of the multiple carriers with potentially very different propagation and coverage characteristics. Furthermore, the proposed solution jointly addresses carrier selection and resource allocation, while taking into account the interference, in a network scenario which serves both users with CA-enabled and legacy terminals.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies mutatis mutandis to any other aspect).

More specifically, one aspect of the present invention relates to a method for scheduling, in a radio mobile network, serving cell/radio resource allocation pairs for transmission of data flows using Carrier Aggregation, wherein each serving cell/radio resource allocation pair comprises a serving cell and a radio resource thereof allocated for transmission of data flows using Carrier Aggregation. At each scheduling period the method comprises:
  determining, among said data flows, active data flows whose transmission is not yet completed at the current scheduling period, and
  iterating, for each active data flow:
    determining candidate serving cells adapted to provide transmission of the active data flows;
    for each radio resource of each candidate serving cell, determining a signal to noise-plus-interference ratio estimate for that active data flow;
    associating, to each candidate serving cell/radio resource pair, a weighting parameter according to said signal to noise-plus-interference ratio estimate and to an indication of the interference caused to other active data flows;
    determining, among said candidate serving cell/radio resource pairs, a potential allocation pair based on the weighting parameter associated with the candidate serving cell/radio resource pair, and calculating a potential amount of data that can be transmitted by the allocation pairs so far determined and the potential allocation pair, and
    identifying said potential allocation pair as allocation pair if said potential amount of data is higher than an overall amount of data that can be transmitted by the allocation pairs so far determined for all the active data flows.

According to an embodiment of the present invention, said determining, among said data flows, active data flows further comprises assigning to each active data flow an urgency value indicative of an amount of data of the active data flow left to complete transmission with respect to a transmission deadline, and said iterating for each active data flow comprises iterating for each active data flow by decreasing urgency value assigned thereto.

According to an embodiment of the present invention, for each radio resource of each candidate serving cell, said signal to noise-plus-interference ratio estimate is based on:
  an attenuation experienced between the candidate serving cell and a user equipment associated with the active data flow under evaluation.

According to an embodiment of the present invention, said attenuation is calculated according to urban propagation models.

According to an embodiment of the present invention, said attenuation depends on:
  an antenna gain of a network node associated with the candidate serving cell,
  an antenna pattern factor, and
  a path loss experienced between the network node and the user equipment.

According to an embodiment of the present invention, said determining a signal to noise-plus-interference ratio estimate further comprises, for each active data flow:
  determining, according to said signal to noise-plus-interference ratio estimate, a first amount of data that can be transferred by each candidate serving cell/radio resource pair during the current scheduling period, and
  determining a second amount of data actually transferred by the candidate serving cell/radio resource pair during the current scheduling period as the minimum between said first amount of data and the data of the active data flow yet to be transmitted.

According to an embodiment of the present invention, for each active data flow, said indication of the interference caused to other active data flows comprises a pollution value given by the sum of the interference experienced by said other active data flows.

According to an embodiment of the present invention, said associating, to each candidate serving cell/radio resource pair, a weighting parameter according to said signal to noise-plus-interference ratio estimate and to an indication of the interference caused to other active data flows comprises, for each active data flow:
  calculating the weighting parameter by dividing said second amount of data by said pollution value.

According to an embodiment of the present invention, said determining, among said data flows, active data flows whose transmission is not yet completed at the current scheduling period and said iterating are performed by evaluating each radio resource of the radio mobile network.

According to an embodiment of the present invention, said identifying said potential allocation pair as allocation pair further comprises making unavailable, for all the active data flows, each candidate serving cell/radio resource pair equal to said potential allocation pair just identified as allocation pair, the method being stopped as soon as all candidate serving cell/radio resource pairs are made unavailable.

According to an embodiment of the present invention, said making unavailable, for all the active data flows, each candidate serving cell/radio resource pair equal to said potential allocation pair just identified as allocation pair is carried out by zeroing the corresponding weighting parameters associated with the active data flows.

According to an embodiment of the present invention, said determining candidate serving cells comprises:
  if no primary serving cell is assigned to a user equipment which the active data flow pertains to, determining as candidate serving cells each serving cell whose power/attenuation ratio is higher than a predefined threshold power/attenuation ratio, or
  if the user equipment which the active data flow pertains to does not support Carrier Aggregation, determining as candidate serving cells each service cell included in a primary serving cell set associated with that user equipment, else, if the user equipment which the active data flow pertains to does support Carrier Aggregation, determining as candidate serving cells:

each serving cell included in the primary serving cell set and in a secondary serving cell set, and each serving cell whose network node is included in the primary serving cell set associated with that user equipment, and whose component carrier is not associated with any one of the primary and secondary serving cells, and whose power/attenuation ratio is higher than said predefined threshold power/attenuation ratio.

According to an embodiment of the present invention, said determining candidate serving cells comprises:

if no primary serving cell is assigned to a user equipment which the active data flow pertains to, determining as candidate serving cells each serving cell whose power/attenuation ratio is higher than a predefined threshold power/attenuation ratio, or if the user equipment which the active data flow pertains to does not support Carrier Aggregation, determining as candidate serving cells each service cell included in a primary serving cell set associated with that user equipment, else, if the user equipment which the active data flow pertains to does support Carrier Aggregation, determining as candidate serving cells:

each serving cell included in the primary serving cell set and in a secondary serving cell set, and each serving cell whose component carrier is not associated with any one of the primary and secondary serving cells, and whose power/attenuation ratio is higher than said predefined threshold power/attenuation ratio.

According to an embodiment of the present invention, the method further comprises, after said identifying said potential allocation pair as allocation pair:

identifying the serving cell of said allocation pair as a primary serving cell providing RRC connection, if no primary serving cell is assigned to the user equipment which active data flow pertains to, or as a secondary service cell providing aggregate component carrier otherwise.

According to an embodiment of the present invention, said determining, among said candidate serving cell/radio resource pairs, a potential allocation pair based on the weighting parameter associated with the candidate serving cell/radio resource pair comprises identifying as potential allocation pair the candidate serving cell/radio resource pair having maximum weighting parameter.

Another aspect of the present invention relates to a control module for scheduling, in a radio mobile network, serving cell/radio resource allocation pairs for transmission of data flows using Carrier Aggregation, wherein each serving cell/radio resource allocation pair comprises a serving cell and a radio resource thereof allocated for transmission of data flows using Carrier Aggregation, wherein at each scheduling period the control module is configured for:

determining, among said data flows, active data flows whose transmission is not yet completed at the current scheduling period, and iterating, for each active data flow:

determining candidate serving cells adapted to provide transmission of the active data flows;

for each radio resource of each candidate serving cell, determining a signal to noise-plus-interference ratio estimate for that active data flow;

associating, to each candidate serving cell/radio resource pair, a weighting parameter according to said signal to noise-plus-interference ratio estimate and to an indication of the interference caused to other active data flows;

determining, among said candidate serving cell/radio resource pairs, a potential allocation pair based on the weighting parameter associated with the candidate serving cell/radio resource pair, and calculating a potential amount of data that can be transmitted by the allocation pairs so far determined and the potential allocation pair, and identifying said potential allocation pair as allocation pair if said potential amount of data is higher than an overall amount of data that can be transmitted by the allocation pairs so far determined for all the active data flows.

The present invention allows efficiently allocating radio resources in a heterogeneous cellular network by taking into account both inter-cell interference and multiple-carriers constraints.

Moreover, the present invention allows compatibility with user equipment not supporting Carrier Aggregation, which requires no change to cellular network communication protocols or infrastructures.

Last but not least, low computational complexity required by the present invention makes it particularly adapted to be used in any cellular network, and at any proper side thereof. Indeed, the present invention may be run at any point of the cellular network providing for radio resources allocation functionalities and users requests management.

BRIEF DESCRIPTION OF THE ANNEXED DRAWINGS

Figure 2A:
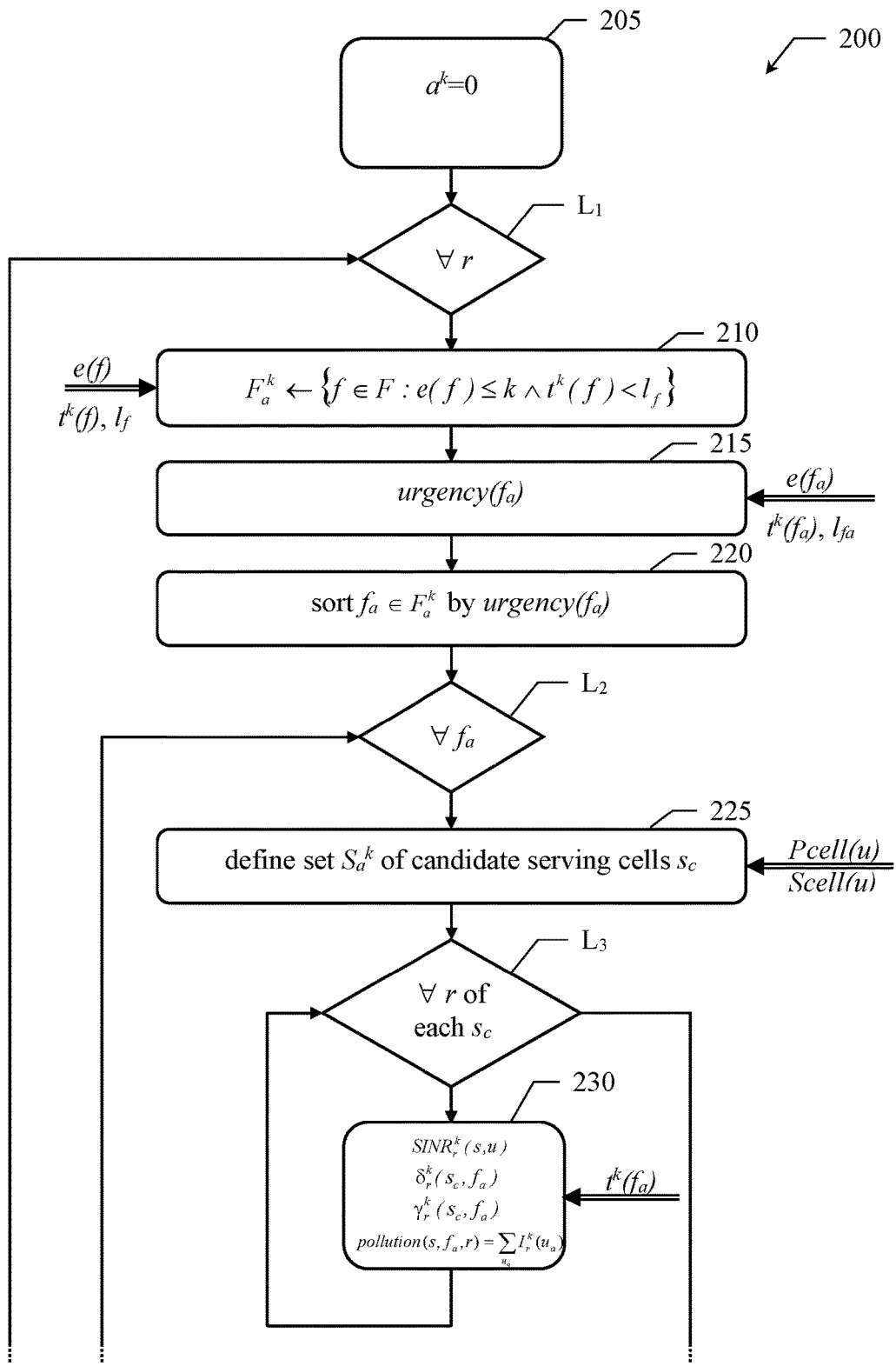
Figure 2B:
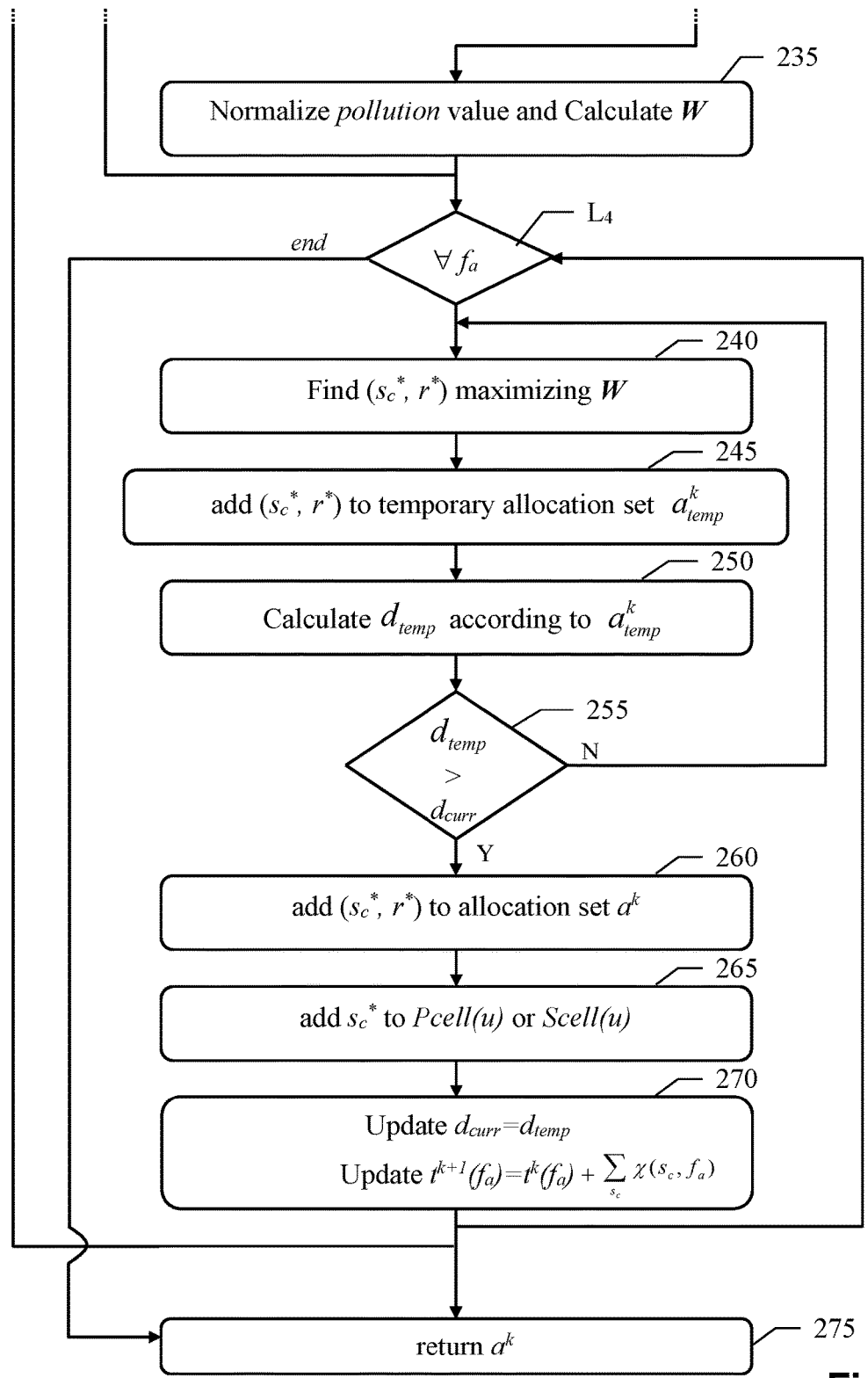

These and other features and advantages of the proposed solution will be made apparent by the following description of some exemplary and non limitative embodiments thereof; for its better intelligibility, the following description should be read making reference to the attached drawings, wherein:

FIG. 1 schematically shows a portion of a cellular network wherein the present invention may be applied, and FIGS. 2A and 2B schematically show an activity flow of an allocation algorithm adapted to be used in the cellular network, according to an embodiment of the present invention.

DETAILED DESCRIPTION OF PREFERRED EMBODIMENTS OF THE INVENTION

With reference to the drawings, a portion of a cellular network 100 according to an embodiment of the present invention is schematically shown in FIG. 1.

The cellular network 100 (e.g., compliant with the 3GPP LTE/LTE-Advanced standard, and allowing data flows transmission based on Carrier Aggregation) comprises a number B of transceiver stations (or network nodes, e.g. network nodes part of eNodeBs) $105_b$ (b=1, 2, 3, 4, . . . B, with B=15 in the example at issue), including relatively high-power and wide-coverage area network nodes (or macro nodes $105_1$-$105_3$) and a lower-power, smaller coverage area network nodes (e.g., pico, micro, and/or femto nodes) for increasing cellular network 100 capacity (or small nodes $105_4$-$105_{15}$).

The network nodes $105_b$ are configured to allow a number U of user equipment $UE_u$ (e.g., mobile phones) of the cellular network 100 (u=1, 2, 3 . . . , U—with U=8 in the depicted example) to exchange data flows (e.g., web browsing, e-mailing, voice, or multimedia data flows). As usual, in case the u-th user equipment $UE_u$ requesting (i.e., having to transmit or having to receive) data flows falls within both macro and small nodes coverage areas, it can be served by either of the macro or small nodes, respectively, i.e. either the macro or small nodes may act as serving network nodes for that u-th user equipment $UE_u$. In order to take into account a practical scenario, both user equipment $UE_u$ supporting Carrier Aggregation and user equipment $UE_u$ not supporting Carrier Aggregation will be considered in the following as potential beneficiaries of the cellular network 100 according to the present invention.

For the sake of completeness, as well known by those having ordinary skill in the art, the network nodes $105_b$ form the radio access network. In turn, the radio access network is generally communicably coupled with one or more core networks (such as the core network CN), which may be coupled with other networks, such as the Internet and/or public switched telephone networks (not illustrated). Preferably, as envisioned by operators and cellular network manufacturers as a result of new, complex tasks and ever increasing amount of data flows that the cellular network is expected to handle, coupling between the radio access network and the core network CN is achieved by means of optical fiber connectivity OF, although this should not be construed limitatively.

As visible in the figure, a control module (or controller) 110 is provided, e.g. in the core network CN (as exemplary illustrated) or in the radio access network, for collecting channel quality information from the network nodes $105_b$ and higher-layer demands (such as content requests) from the user equipment $UE_u$, and, from the collected channel quality information and content requests, for scheduling radio resources allocation, namely:

(i) which network node $105_b$ should act as serving network node for serving each content request (i.e., allowing data flows transmission to/from the respective u-th user equipment $UE_u$);

(ii) on which available component carriers each serving network node should serve the content request. In the considered scenario, a set c=1, 2, ..., C of component carriers is available at network nodes $105_b$—each c-th component carrier being defined by a central frequency $f_c$ and a bandwidth $w_c$ (e.g., supported by LTE/LTE-A standard and ranging from 1.4 MHz to 20 MHz), and comprising a number r=1, 2, 3, ..., $R_c$ of radio resources (e.g., $R_c$=50 if $w_c$=10 MHz)—the total number of radio resources R available in the cellular network 100 being $R=\Sigma_c R_c$. In order to ensure backward compatibility in the cellular network 100, each network node/component carrier combination will be considered as a respective serving cell. According to Carrier Aggregation principles, each serving cell may be either a primary serving cell, handling RRC connection, or a secondary serving cell, for providing additional component carrier that can be used in the Carrier Aggregation procedure (the secondary serving cells being added and removed as required, whereas the primary serving cells being only changed at handover). Thus, each u-th user equipment $UE_u$ (either supporting or not supporting Carrier Aggregation) is associated with a primary serving cell (any u-th user equipment $UE_u$ not supporting Carrier Aggregation connecting to it by using standard LTE Release 8 procedures), whereas each u-th user equipment $UE_u$ supporting Carrier Aggregation is further associated with a set of (e.g., one or more) secondary serving cells providing additional component carriers to be aggregated for (transmission of the data flow associated with) that u-th user equipment $UE_u$; and (iii) which radio resource to employ for data flow transmission.

According to the present invention, a scheduling algorithm 200 (whose flow chart of significant method steps is illustrated in FIGS. 2A and 2B) is implemented at the controller 110 at each k-th timestep (scheduling period) for effectively scheduling allocation of serving cells/radio resources pairs for transmission of data flows between the network nodes $105_b$ and the user equipment $UE_u$—each serving cell/radio resource pair comprising a serving cell and a radio resource thereof for transmission of a respective data flow.

According to an embodiment of the present invention, allocation of serving cells/radio resources pairs scheduling takes place on a sub-frame basis, thus each k-th timestep over which the allocation algorithm 200 is repeated is 1 ms-lasting (i.e., k=1, 2, 3, ..., K=10 for each frame).

As should be readily understood, the scheduling algorithm 200 may be performed by proper code means included in a computer program, when the program is run on a computer.

In the following, for the sake of conciseness, communications from the network nodes $105_b$ to the user equipment $UE_u$ (downlink communication), and unicast download traffic will be considered only—anyway, the principle of the present invention may be equivalently applied to Carrier Aggregation in uplink communication.

The scheduling algorithm 200 is a heuristic algorithm for constructing, based on information available at the controller 110, an interference-aware allocation set, globally denoted by $a^k$ and comprising the set of serving cells/radio resources pairs allocated for data flow transmission at the k-th timestep (hereinafter, allocation pairs). As better discussed herebelow, the scheduling algorithm 200 also takes into account information about content request, such as size thereof and acceptable delivery times.

The scheduling algorithm 200 starts by initializing (step 205) the allocation set $a^k$ at a proper initialization value (e.g., 0), thereafter the following steps 210-270 are iterated for each r-th radio resource (as conceptually illustrated in FIG. 2A by loop control $L_1$)—as will be better understood from the following description, iteration over each r-th, and hence at least R times for each k-th timestep, allows evaluating all (available and not available) radio resources at least once at each k-th timestep.

Then (step 210), the scheduling algorithm 200 goes on by identifying, among a total set F of data flows f, an active data flows set $F_a^k$, i.e. a set $F_a^k$ of active data flows $f_a$ whose transmission is started before, or at, the current k-th timestep and is not yet completed—without losing of generality, in the following description each u-th user equipment $UE_u$ will be assumed to be associated with only one active data flow $f_a$ at each k-th timestep. According to an embodiment of the present invention, a data flow f is identified as active data flow $f_a$ if the timestep at which the data flow f has started is before or at the current k-th timestep and a total amount of data of the data flow f transmitted up to k-th timestep is lower than a total amount of data of the data flow f, i.e.:

$$F_a^k \leftarrow \{f \in F : e(f) \leq k \wedge t^k(f) < l_f\}$$

wherein:

e(f)∈K denotes the timestep at which the data flow f has started, $t^k$ (f) denotes the total amount of data, of each data flow f, transmitted up to k-th timestep ($t^k$ (f) being thus indicative of the amount of data, of the respective data flow f, whose transmission have already been completed at the current k-th timestep), and $l_f$ denotes the total amount of data of the data flow f.

Preferably, although not necessarily, each active data flow $f_a$ in the active data flow set $F_a^k$ is assigned (step 215) with an urgency value (urgency($f_a$)) indicative of an urgency of completing transmission of the active data flow $f_a$ within a transmission deadline $g_{f_a}$ (e.g., a time window from the start of the active data flow $f_a$), and equal to the ratio between the amount of data still left to complete the active data flow $f_a$ and the time still left before expiration of delivery deadline, i.e.:

$$\text{urgency}(f_a) = \frac{l_{f_a} - t^k(f_a)}{e(f_a) + g_f - k} \forall \, f_a \in F_a^k$$

wherein, similarly to the above:

$e(f_a)$ denotes the timestep at which the active data flow $f_a$ has started, $t^k(f_a)$ denotes the total amount of data, of each active data flow $f_a$, transmitted up to k-th timestep, and $l_f$ denotes the total amount of data of the active data flow $f_a$.

Then, the active data flows $f_a$ of the active flow set $F_a^k$ are preferably sorted (step 220) based on the assigned urgency value urgency($f_a$). Even more preferably, said sorting is carried out by decreasing urgency value urgency($f_a$), so that the following steps aimed at iteratively scheduling allocation pairs for each active data flow $f_a$ take into account, at each iteration, the most "priority" active data flows $f_a$ first.

It should be noted that repetition of the steps 210-220 for each r-th radio resource is advantageous (and particularly preferred) when the active data flows $f_a$ are updated within each k-th timestep at least twice (such as when, as herein exemplary assumed, active data flows $f_a$ updating takes place just after a new serving cell/radio resource pair, with the respective active data flow $f_a$, is added to the allocation set $a^k$). However, according to an alternative embodiment, not shown, the steps 210-220 may be performed only once at each k-th timestep (e.g., due to rare or no active data flows $f_a$ updating within each k-th timestep), in which case the steps 210-220 would be performed immediately after the step 205 (and before the loop control $L_1$).

As conceptually illustrated in FIG. 2A by loop control $L_2$, the following steps 225-235 are iterated for each active data flow $f_a$ of the active flows set $F_a^k$ (or, equivalently, for each u-th user equipment $UE_u$ associated therewith).

More particularly, for each active data flow $f_a$ of the active flows set $F_a^k$ (also referred to as active data flow $f_a$ under evaluation), a candidate serving cells set $S_a^k(u)$—i.e., a set $S_a^k(u)$ of candidate serving cells $s_c$ among a total set S of serving cells s of the cellular network 100—is defined at step 225 according to primary Pcell(u) and secondary Scell(u) serving cells sets (the primary Pcell(u) and secondary Scell (u) serving cells sets comprising primary and secondary serving cells, respectively, possibly associated with each u-th user equipment $UE_u$).

Preferably, as discussed herebelow, definition of the set $S_a^k(u)$ of candidate serving cells s takes place based on whether single-flow Carrier Aggregation or multi-flow Carrier Aggregation is implemented. According to single-flow Carrier Aggregation, each u-th user equipment $UE_u$ can be only served by one network node $105_b$ at a time in all component carriers available at that network node $105_b$, whereas, according to multi-flow Carrier Aggregation, each u-th user equipment $UE_u$ can be served by multiple network nodes $105_b$ as long as they are on different component carriers.

An exemplary pseudo-code for defining the set $S_a^k(u)$ of candidate serving cells $s_c$ in a single-flow Carrier Aggregation scenario may be based on checking all the network nodes $105_b$ in the following way:

--- if Pcell(u) is empty
    for all s ∈ S do
        if P/A ≥ $TH_{P/A}$
            $S_a^k(u) \rightarrow S_a^k(u) \cup s$
else
    if u ∈ $U_{noca}$
        $S_a^k(u) \rightarrow$ Pcell(u)
    else if u ∈ $U_{ca}$
        $S_a^k(u) \rightarrow$ Pcell(u) ∪ Scell(u)
        b* → b ∈ Pcell(u)
        for all c ∈ C: c ∉ Pcell(u) ĉ ∉ Scell(u) do
            $s_c \rightarrow (b^*, c)$
            if P/A ≥ $TH_{P/A}$
                $S_a^k(u) \rightarrow S_a^k(u) \cup s_c$

--- wherein:

P/A denotes a ratio between transmission power and attenuation (hereinafter, power/attenuation ratio) experienced between a serving cell $s_c$ and a u-th user equipment $UE_u$;

$TH_{P/A}$ denotes a predefined power/attenuation ratio threshold (e.g., $TH_{P/A}$=−70 dBm);

$U_{ca}$ denotes the set of user equipment $UE_u$ supporting Carrier Aggregation and U denotes the set of user equipment $UE_u$ not supporting Carrier Aggregation thus, $U=U_{ca} \cup U_{noca}$); and b* denotes the network node $105_b$ of a candidate serving cell $s_c$.

In other words, if no primary serving cell is assigned to the u-th user equipment $UE_u$ which the active data flow $f_a$ under evaluation pertains to (i.e., primary serving cell set Pcell(u) for that u-th user equipment $UE_u$ being empty), each serving cell s whose power/attenuation ratio P/A (between it and that u-th user equipment $UE_u$) is higher than said predefined power/attenuation ratio threshold $TH_{P/A}$ is identified as candidate serving cell $s_c$ and added to the candidate serving cells set $S_a^k(u)$.

Otherwise (i.e., primary serving cell set Pcell(u) for that u-th user equipment $UE_u$, being not empty), if the u-th user equipment $UE_u$ does not support Carrier Aggregation (i.e., it belongs to set $U_{noca}$), each service cell s included in the primary serving cell set Pcell(u) associated with that u-th user equipment $UE_u$ is identified as candidate serving cell $s_c$ (and added to the candidate serving cells set $S_a^k(u)$). If, instead, the u-th user equipment $UE_u$ does support Carrier Aggregation (i.e., it belongs to set $U_{ca}$), serving cells s included in the primary Pcell(u) and secondary Scell(u) serving cell sets, and serving cells whose b-th network node $105_b$ is included in the primary serving cell set Pcell(u) associated with that u-th user equipment $UE_u$, and whose c-th component carrier is not associated with any one of the primary and secondary serving cells, and serving cells whose power/attenuation ratio P/A (between it and that u-th user equipment $UE_u$) is higher than said predefined power/attenuation ratio threshold $TH_{P/A}$ are identified as candidate serving cells $s_c$ and added to the candidate serving cells set $S_a^k(u)$.

An exemplary pseudo-code for defining the set $S_a^k(u)$ of candidate serving cells $s_c$ in a multi-flow Carrier Aggregation scenario may be based on checking all the network nodes $105_b$ in the following way (wherein P/A, $TH_{P/A}$, $U_{ca}$, and $U_{noca}$ denote the same entities of above):

```
if Pcell(u) is empty
    for all s ∈ S do
        if P/A ≥ TH_{P/A}
            S_a^k(u) → S_a^k(u) ∪ s
else
    if u ∈ U_{noca}
        S_a^k(u) → Pcell(u)
    else if u ∈ U_{ca}
        S_a^k(u) → Pcell(u) ∪ Scell(u)
        for all s ∈ S and for all c ∈ s:c ∉ Pcell(u)^c ∉ Scell(u) do
            if P/A ≥ TH_{P/A}
                S_a^k(u) → S_a^k(u) ∪ s
```

In other words, if no primary serving cell is assigned to the u-th user equipment $UE_u$ which the active data flow $f_a$ under evaluation pertains to (i.e., primary serving cell set Pcell(u) for that u-th user equipment $UE_u$ being empty), each serving cell s whose power/attenuation ratio P/A (between it and that u-th user equipment $UE_u$) is higher than said predefined power/attenuation ratio threshold $TH_{P/A}$ is identified as candidate serving cell $s_c$ and added to the candidate serving cells set $S_a^k(u)$.

Otherwise (i.e., primary serving cell set Pcell(u) for that u-th user equipment $UE_u$ being not empty), if the u-th user equipment $UE_u$ does not support Carrier Aggregation (i.e., it belongs to set $U_{noca}$), each service cell s included in the primary serving cell set Pcell(u) associated with that u-th user equipment $UE_u$ is identified as candidate serving cell $s_c$ (and added to the candidate serving cells set $S_a^k(u)$). If, instead, the u-th user equipment $UE_u$ does support Carrier Aggregation (i.e., it belongs to set $U_{ca}$), serving cells s included in the primary Pcell(u) and secondary Scell(u) serving cell sets, and serving cells s (among the serving cells set S) whose c-th component carrier is not associated with any one of the primary and secondary serving cells, and serving cells s (among the serving cells set S) whose power/attenuation ratio P/A (between it and that u-th user equipment $UE_u$) is higher than said predefined power/attenuation ratio threshold $TH_{P/A}$ are identified as candidate serving cells $s_c$ and added to the candidate serving cells set $S_a^k(u)$.

As conceptually illustrated in FIG. 2A by loop control $L_3$, the following operations (carried out at step 230) are iterated for each r-th radio resource of each candidate serving cell $s_c$ (until all the radio resources in the candidate serving cells set $S_a^k$ have been considered, which condition causes the scheduling algorithm 200 to exit from the loop control $L_3$).

More particularly, for each r-th radio resource of each candidate serving cell $s_c$, a signal to interference-plus-noise ratio estimate $SINR_r^k(s_c,u)$ (hereinafter, $SINR_r^k(s_c,u)$ estimate) is determined for the active data flow $f_a$ under evaluation as follows:

$$SINR_r^k(s_c, u) = \frac{P(s_c, u)}{A(s_c, u)(N + I_r^k(u))}$$

wherein:

$P(s_c,u)$ denotes the transmission power of the candidate serving cell $s_c$ when transmission to the u-th user equipment $UE_u$ associated with the active data flow $f_a$ under evaluation takes place—such a transmission power $P(s_c,u)$ depending on the serving network node type (i.e., whether it is a macro node or a small node);

$A(s_c,u)$ denotes the attenuation experienced between the candidate serving cell $s_c$ and the u-th user equipment $UE_u$ associated with the active data flow $f_a$ under evaluation, and is preferably calculated according to urban propagation models—such as those specified in ITU-R, "*Guidelines for evaluation of radio interface technologies for IMT-Advanced*", Report ITU-R M.2135-1, December 2009, namely:

$$A(s_c,u) = G_T + AP(\theta_{b,u}) - PL(s_c,u)$$

wherein $G_T$ is the antenna gain of the network node associated with the candidate serving cell, $AP(\theta_{b,u})$ is the antenna pattern factor, which depends on the angle $\theta(b,u)$ between an antenna maximum direction of the b-th network node $105_b$ and the direction between the antenna and the u-th user equipment $UE_u$, and $PL(s_c,u)$ is the path loss experienced between the network node and the u-th user equipment $UE_u$ (the latter depending on the central frequency $f_c$ of the component carrier used by the serving cell $s_c$, the distance between the network node and the u-th user equipment $UE_u$, on the Line of Sight (LoS) conditions between them, and on transmitting and receiving antenna heights; and $I_r^k(u)$ denotes the total interference experienced by the u-th user equipment $UE_u$ on the r-th radio resource and is preferably equal to:

$$I_r^k(u) = \sum_{r \text{ allocated to } (s_i, u_i) \text{ at } k} \frac{P(s_i, u_i)}{A(s_i, u)}$$

being $P(s_i,u_i)/A(s_i,u)$ the interference experienced by the u-th user equipment $UE_u$ caused by another serving cell $s_i$ that is operating on the same r-th radio resource of the same c-th component carrier.

Afterwards, yet for each active data flow $f_a$ of the active data flows set $F_a^k$, a weighting parameter W is calculated for, and associated with, each candidate serving cell-radio resource pair according to said $SINR_r^k(s_c, u)$ estimate and to an indication of the interference caused to (e.g., some or, as herein exemplary assumed, all) other active data flows $f_a$ of the cellular network 100—referred to as pollution hereinafter.

According to an embodiment of the present invention, in order to achieve that, the $SINR_r^k(s_c, u)$ estimate is used to extract (still at step 230) the amount of data $\delta_r^k(s_c,f_a)$ of the active data flow $f_a$ that can be transferred by each candidate serving cell/radio resource pair during the (current) k-th timestep (e.g., based on D. Martin-Sacristàn, J. F. Monserrat, J. Cabrejas-Penuelas, D. Calabuig, S. Garrigas, N. Cardona, "*3GPP long term evolution: Paving the way towards next 4G*", Waves, 2009), thereafter the amount of data $\gamma_r^k(s_c, f_a)$ actually transferred by the candidate serving cell/radio resource pair during the (current) k-th timestep as the minimum between the amount of data ($\delta_r^k(s_a, f_a)$) and the data of the active data flow $f_a$ yet to be transmitted, i.e.:

$$\gamma_r^k(s_c, f_a) = \min(\delta_r^k(s_c, f_a), l_{f_a} - t^k(f_a))$$

Then (still at step 230), for each candidate serving cell/radio resource pair, a pollution value is calculated that takes into account the interference each allocation may generate. For the purposes of the present invention, for each active data flow $f_a$ under evaluation, the pollution value may be defined as the potential interference caused to (e.g., all) other active data flows $f_a$ in the cellular network 100 if that particular candidate serving cell/radio resource pair is added to the allocation set $a^k$, and is preferably calculated as the sum of the interferences experienced by said other active data flows $f_a$, i.e.:

$$\text{pollution}(s, f_a, r) = \sum_{u_a} l_r^k(u_a) \text{ given } a^k \cup (s, f, r),$$

being $u_a$ the users equipments with active traffic flows $f_a$ different from the active data flow $f_a$ under evaluation.

Thereafter, step 235, the pollution values are normalized and weighting parameters W are obtained (each one for each candidate serving cell/radio resource pair of each active data flow $f_a$) as follows:

$$W = \frac{\gamma_r^k(s, f_a)}{\text{pollution}(s, f_a, r)}$$

Then, as conceptually illustrated in FIG. 2B by loop control $L_4$, the following steps 240-255 are iterated for each active data flow $f_a$, until a candidate service cell/radio resource pair for each active data flow $f_a$ is added to the allocation set $a^k$.

More particularly, for each active data flow $f_a$, and among the candidate serving cell/radio resource pairs (with the associated weighting parameters W), a potential (candidate serving cell/radio resource) allocation pair $(s_c^*, r^*)$ is determined based on the weighting parameter W associated with the candidate serving cell/radio resource pairs. Preferably, among the candidate serving cell/radio resource pairs, a potential allocation pair $(s_c^*, r^*)$ is determined as the candidate serving cell/radio resource pair associated with a best weighting parameter W according to a predetermined selection criterion (the predetermined selection criterion being not limiting for the present invention). According to embodiments of the present invention, such a predetermined selection criterion comprises a comparison with respect to a threshold weighting parameter. Alternatively (as in the considered example), or additionally, such a predetermined selection criterion comprises determining the best weighting parameter W as the maximum weighting parameter W (step 240), i.e.:

$$s^*, r^* \leftarrow \arg\max_{s,r} W$$

and the potential allocation pair $(s_c^*, r^*)$ under evaluation is added to a temporary allocation set $a^k_{temp}$ (step 245)—the temporary allocation set $a^k_{temp}$ thus comprising all allocation pairs so far determined (i.e., the current allocation set $a_k$) and the potential allocation pair under evaluation, i.e.:

$$a_{temp}^k = a_k \cup (s_c^*, r^*)$$

Then (step 250), a potential amount of data $d_{temp}$ that can be transmitted by the allocation pairs so far determined and the potential allocation pair (i.e., according to the temporary allocation set $a^k_{temp}$) is calculated as follows:

$$d_{temp} \leftarrow \Sigma_{f_a} \Sigma_{s_c} \chi^k(s_c, f_a)$$

wherein $\chi^k(s_c, f_a)$ denotes the total amount of data pertaining to the active data flow $f_a$ transferred by the candidate serving cell $s_c$ over all allocated radio resources during the k-th timestep, i.e.:

$$\chi^k(s_c, f_a) = \sum_{r \in R} \gamma_r^k(s_c, f_a)$$

Afterwards, the potential allocation pair $(s_c^*, r^*)$ is identified as (actual) allocation pair (and added to the allocation set $a^k$) if the potential amount of data $d_{temp}$ is higher than an overall amount of data $d_{curr}$ that can be transmitted by the allocation pairs so far determined for all the active data flows $f_a$ (i.e., the current allocation set $a_k$) and equal to:

$$d_{curr} \leftarrow \Sigma_{f_a} \Sigma_{s_c} \gamma_r^k(s_c, f_a | a^k)$$

This is conceptually shown at decision step 255, wherein a check is performed aimed at evaluating whether the potential allocation pair $(s_c^*, r^*)$ increases the overall amount of data that can be transferred over the cellular network 100 (i.e., $d_{temp} > d_{curr}$). In the affirmative case (exit branch Y of the decision step 255), the potential allocation pair $(s_c^*, r^*)$ is added permanently to the allocation set $a^k$ (step 260), otherwise (exit branch N of the decision step 255), steps 240-255 are reiterated for another potential allocation pair (for the same active data flow $f_a$).

Preferably, when a potential allocation pair $(s_c^*, r^*)$ is added permanently to the allocation set $a^k$, the weighting parameters W associated with all candidate serving cell/radio resource pairs $(s_c^*, r^*)$ associated with all other active data flows $f_a$ are set to 0, thus making that particular candidate serving cell/radio resource pair $(s_c^*, r^*)$ unavailable for the other active data flows $f_a$ once it is added to the allocation set $a^k$. This ensures that in the following iteration, the next best allocation pair is selected.

As should be readily understood, although not shown, whenever the weighting parameters W are all set to 0, it meaning that no potential candidate serving cell/radio resource pairs fulfilling the interference constraints according to the present invention can be allocated to any other active data flow $f_a$, the scheduling algorithm 200 exits from the loop control $L_4$ (and goes on directly to step 275, where it ends).

Then (step 265) the serving cell of the just-added allocation pair is identified as a primary serving cell Pcell(u) or as a secondary serving cell Scell(u) for the u-th user equipment $UE_u$ which the active data flow $f_a$ associated with such an allocation pair pertains to. According to an embodiment of the present invention, the serving cell of the just-added allocation pair is identified as a primary serving cell (and added to the primary serving cells set Pcell(u) for the u-th user equipment $UE_u$) if no primary serving cell is assigned to said u-th user equipment $UE_u$, or as a secondary service cell providing aggregate component carrier (and added to the secondary serving cells set Scell(u) for the u-th user equipment $UE_u$) otherwise.

Thus, the scheduling algorithm 200 according to the discussed embodiment admits empty primary Pcell(u) and secondary Scell(u) serving cells sets, and selects the primary or secondary cells for each user equipment $UE_u$ along the way. However, as an alternative, predefined (fixed, unchangeable) primary Pcell(u) and secondary Scell(u) serving cells sets may be provided, in which case the scheduling algorithm 200 may be configured to schedule the user equipments $UE_u$ (i.e., the associated active data flows $f_a$) only by taking into account the serving cells indicated in these sets.

Then (step 270), the potential amount of data $d_{temp}$ is set as the (actual) overall amount of data $d_{curr}$ that can be transmitted by the allocation set $a_k$ so far determined (and including the potential allocation pair ($s_c^*, r^*$), and the respective active data flow $f_a$, lastly added to the allocation set $a_k$), i.e.:

$$d_{curr} = d_{temp}$$

and the total amount of data, of each active data flow $f_a$, transmitted at the following, (k+1)-th, timestep (denoted as $t^{k+1}(f_a)$) is updated, with respect to the total amount of data, of the same active data flow $f_a$, transmitted up to k-th timestep (i.e., $t^k(f_a)$), as follows:

$$t^{k+1}(f_a) = t^k(f_a) + \sum_{s_c} \chi(s_c, f_a)$$

and used as input (at step 210), together with new data flows f requests, at the next running of the scheduling algorithm 200.

Then, the steps 240-270 are iterated for each active data flow $f_a$ until the active data flows $f_a$ are completed (in which case, as conceptually illustrated by "end" arrow from loop control $L_4$, the scheduling algorithm 200 goes on to step 275), thereafter the steps 210-270 are iterated for each r-th radio resource until all radio resources are evaluated (loop connection $L_1$). It should be noted that not all radio resources available at a serving cell are necessarily allocated indeed, allocation of a radio resource is avoided when causing high interference to user equipment that are being served on that radio resource from other serving cells.

Finally, the scheduling algorithm 200, outputs the allocation set $a^k$ (step 275). As should be readily understood from the foregoing, the allocation set $a^k$ comprises serving cell/radio resource pairs each one associated with a respective active data flow $f_a$—or, otherwise stated, the allocation set $a^k$ comprises serving cell/radio resource/active data flow triplets.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the solution according to an embodiment of the invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the cellular network has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

Moreover, although explicit reference has been made to a cellular network based on the LTE/LTE-Advanced standard, it should be understood that it is not in the intentions of the Applicant to be limited to the implementation of any particular wireless communication system architecture or protocol. In this respect, it is also possible to provide that, with suitable simple modifications, the proposed scheduling algorithm may be applied also to other cellular networks, such as the view forthcoming 5G (and beyond) cellular networks.

The invention claimed is:

1. A method for scheduling, in a radio mobile network, serving cell/radio resource allocation pairs for transmission of data flows using Carrier Aggregation, wherein each serving cell/radio resource allocation pair comprises a serving cell and a radio resource thereof allocated for transmission of data flows using Carrier Aggregation, at each scheduling period, the method comprising:
   determining, among said data flows, active data flows whose transmission is not yet completed at the current scheduling period, and
   iterating, for each active data flow:
      determining candidate serving cells adapted to provide transmission of the active data flows;
      for each radio resource of each candidate serving cell, determining a signal to noise-plus-interference ratio estimate for that active data flow;
      associating, to each candidate serving cell/radio resource pair, a weighting parameter according to said signal to noise-plus-interference ratio estimate and to an indication of the interference caused to other active data flows;
      determining, among said candidate serving cell/radio resource pairs, a potential allocation pair based on the weighting parameter associated with the candidate serving cell/radio resource pair, and calculating a potential amount of data that can be transmitted by the allocation pairs so far determined and the potential allocation pair; and
      identifying said potential allocation pair as allocation pair if said potential amount of data is higher than an overall amount of data that can be transmitted by the allocation pairs so far determined for all the active data flows.

2. The method according to claim 1, wherein said determining, among said data flows, active data flows further comprises assigning to each active data flow an urgency value indicative of an amount of data of the active data flow left to complete transmission with respect to a transmission deadline, and wherein said iterating for each active data flow comprises iterating for each active data flow by decreasing urgency value as signed thereto.

3. The method according to claim 1, wherein, for each radio resource of each candidate serving cell, said signal to noise-plus-interference ratio estimate is based on:
an attenuation experienced between the candidate serving cell and a user equipment associated with the active data flow under evaluation.

4. The method according to claim 3, wherein said attenuation depends on:
an antenna gain of a network node associated with the candidate serving cell,
an antenna pattern factor, and
a path loss experienced between the network node and the user equipment.

5. The method according to claim 1, wherein said determining a signal to noise-plus-interference ratio estimate further comprises, for each active data flow:
determining, according to said signal to noise-plus-interference ratio estimate, a first amount of data that can be transferred by each candidate serving cell/radio resource pair during the current scheduling period, and
determining a second amount of data actually transferred by the candidate serving cell/radio resource pair during the current scheduling period as the minimum between said first amount of data and data of the active data flow yet to be transmitted.

6. The method according to claim 5, wherein, for each active data flow, said indication of the interference caused to other active data flows comprises a pollution value given by the sum of the interference experienced by said other active data flows.

7. The method according to claim 6, wherein said associating, to each candidate serving cell/radio resource pair, a weighting parameter according to said signal to noise-plus-interference ratio estimate and to an indication of the interference caused to other active data flow comprises, for each active data flow:
calculating the weighting parameter by dividing said second amount of data by said pollution value.

8. The method according to claim 1, wherein said determining, among said data flows, active data flows whose transmission is not yet completed at the current scheduling period and said iterating are performed by evaluating each radio resource of the radio mobile network.

9. The method according to claim 1, wherein said identifying said potential allocation pair as allocation pair further comprises making unavailable, for all the active data flows, each candidate serving cell/radio resource pair equal to said potential allocation pair just identified as allocation pair, the method being stopped as soon as all candidate serving cell/radio resource pairs are made unavailable.

10. The method according to claim 9, wherein said making unavailable, for all the active data flows, each candidate serving cell/radio resource pair equal to said potential allocation pair just identified as allocation pair is carried out by zeroing the corresponding weighting parameters associated with the active data flows.

11. The method according to claim 1, wherein said determining candidate serving cells comprises:
if no primary serving cell is assigned to a user equipment which the active data flow pertains to, determining as candidate serving cells each serving cell whose power/attenuation ratio is higher than a predefined threshold power/attenuation ratio, or
if the user equipment which the active data flow pertains to does not support Carrier Aggregation, determining as candidate serving cells each service cell included in a primary serving cell set associated with that user equipment, else, if the user equipment pertains to does support Carrier Aggregation, determining as candidate serving cells:
each serving cell included in the primary serving cell set and in a secondary serving cell set, and
each serving cell
whose network node is included in the primary serving cell set associated with that user equipment, and
whose component carrier is not associated with any one of the primary and secondary serving cells, and
whose power/attenuation ratio is higher than said predefined threshold power/attenuation ratio.

12. The method according to claim 1, wherein said determining candidate serving cells comprises:
if no primary serving cell is assigned to a user equipment which the active data flow pertains to, determining as candidate serving cells each serving cell whose power/attenuation ratio is higher than a predefined threshold power/attenuation ratio, or
if the user equipment which the active data flow pertains to does not support Carrier Aggregation, determining as candidate serving cells each service cell included in a primary serving cell set associated with that user equipment, else, if the user equipment which the active data flow pertains to does support Carrier Aggregation, determining as candidate serving cells:
each serving cell included in the primary serving cell set and in a secondary serving cell set, and
each serving cell
whose component carrier is not associated with any one of the primary and secondary serving cells, and
whose power/attenuation ratio is higher than said predefined threshold power/attenuation ratio.

13. The method according to claim 1, further comprising, after said identifying said potential allocation pair as allocation pair:
identifying the serving cell of said allocation pair as a primary serving cell providing RRC connection, if no primary serving cell is assigned to user equipment which active data flow pertains to, or as a secondary service cell providing aggregate component carrier otherwise.

14. The method according to claim 1, wherein said determining, among said candidate serving cell/radio resource pairs, a potential allocation pair based on the weighting parameter associated with the candidate serving cell/radio resource pair comprises identifying as potential allocation pair the candidate serving cell/radio resource pair having maximum weighting parameter.

15. A controller for scheduling, in a radio mobile network, serving cell/radio resource allocation pairs for transmission of data flows using Carrier Aggregation, wherein each serving cell/radio resource allocation pair comprises a serving cell and a radio resource thereof allocated for transmission of data flows using Carrier Aggregation, wherein at each scheduling period the controller is configured for:
determining, among said data flows, active data flows whose transmission is not yet completed at the current scheduling period, and
iterating, for each active data flow:
determining candidate serving cells adapted to provide transmission of the active data flows;
for each radio resource of each candidate serving cell, determining a signal to noise-plus-interference ratio estimate for that active data flow;
associating, to each candidate serving cell/radio resource pair, a weighting parameter according to said signal to noise-plus-interference ratio estimate and to an indication of the interference caused to other active data flows;

determining, among said candidate serving cell/radio resource pairs, a potential allocation pair based on the weighting parameter associated with the candidate serving cell/radio resource pair, and calculating a potential amount of data that can be transmitted by the allocation pairs so far determined and the potential allocation pair; and identifying said potential allocation pair as allocation pair if said potential amount of data is higher than an overall amount of data that can be transmitted by the allocation pairs so far determined for all the active data flows.

* * * * *